(12) United States Patent
DiFazio et al.

(10) Patent No.: US 6,801,510 B2
(45) Date of Patent: Oct. 5, 2004

(54) SYSTEM AND METHOD FOR USING UNUSED ARBITRARY BITS IN THE DATA FIELD OF A SPECIAL BURST

(75) Inventors: Robert A. DiFazio, Greenlawn, NY (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 65 days.

(21) Appl. No.: 10/268,476

(22) Filed: Oct. 10, 2002

(65) Prior Publication Data

US 2003/0072276 A1 Apr. 17, 2003

Related U.S. Application Data

(60) Provisional application No. 60/328,621, filed on Oct. 11, 2001.

(51) Int. Cl.$^7$ ................................................ H04Q 7/00
(52) U.S. Cl. ........................ 370/328; 370/523; 375/220
(58) Field of Search ................................ 370/336, 342, 370/318, 345, 347, 328, 329, 523, 522; 375/220

(56) References Cited

U.S. PATENT DOCUMENTS 6,038,238 A    3/2000   Jokinen et al.
6,282,182 B1   8/2001   Pecen et al.
6,331,975 B1   12/2001  Hosur et al.
6,477,176 B1 * 11/2002  Hamalainen et al. ........ 370/435
2001/0014113 A1 * 8/2001 Imura .......................... 375/141
2001/0022782 A1 * 9/2001 Steudle ........................ 370/335
2002/0009061 A1 * 1/2002 Willenegger ................. 370/328

FOREIGN PATENT DOCUMENTS

WO   9836508   8/1998
WO   0074289   12/2000

* cited by examiner

Primary Examiner—Wellington Chin
Assistant Examiner—Raj Jain
(74) Attorney, Agent, or Firm—Volpe and Koenig, P.C.

(57) ABSTRACT

A system and method for reducing the unused capacity of a wireless communication channel utilize the data fields of an SB in order to signal physical layer control signaling for coordination between a Node B and a UE. The control signaling may include improved reception of SBs, enclose transmit power control commands or any physical layer control signaling for coordination between the UE and the Node B for synchronization timing advance or reconfiguration of the physical channel. This system and method may be applied independently to the uplink and the downlink.

24 Claims, 2 Drawing Sheets

SYSTEM AND METHOD FOR USING UNUSED ARBITRARY BITS IN THE DATA FIELD OF A SPECIAL BURST

CROSS REFERENCE TO RELATED APPLICATION

This application claims priority from U.S. Provisional Pat. Appln. No. 60/328,621 filed on Oct. 11, 2001 which is incorporated by reference as is fully set forth.

BACKGROUND

The present invention is related to time division duplex (TDD) communication systems. More particularly, the present invention is directed to utilizing unused channel capacity during the transmission of a special burst (SB).

TDD communication systems utilize both common channels and dedicated channels. Once a dedicated channel has been established in a TDD system, when the transmitter does not have any user data to send, the transmitter enters a mode known as discontinuous transmission mode (DTX). DTX may exist in either the uplink or the downlink, and DTX may exist on the uplink independently from the downlink or on the downlink independently of the uplink.

When DTX is entered, the transmitter periodically sends a transmission known as a special burst (SB). Referring to FIG. 1, the SB comprises a midamble, two (2) transport format combination indicator (TFCI) fields, one transmit power control (TPC) field and two (2) data fields. The two (2) data fields are unused in an SB. Accordingly, arbitrary bits are used to fill in these data fields. These arbitrary bits are wasted channel capacity which would otherwise be transmitted and available for communicating information. Since these SBs are transmitted periodically to indicate DTX, a great deal of channel capacity is wasted. A normal burst (NB) is similar to an SB, except that the data fields contain useful data so the channel capacity is not wasted.

There are several reasons for transmitting SBs. The first reason is for fast channel establishment. Upon initial establishment of a physical channel, there is typically no data available. The transmitter must transmit some information to which the receiver can determine the availability of the physical channel. This permits the receiver to quickly recognize the availability of the channel so that data transmissions that require reliable Quality of Service (QoS) can be initiated.

The second reason for transmitting SBs occurs after a channel has been established and the channel enters DTX. The transmission of SBs avoids erroneous detection of "out-of-synchronization". The out-of-sync condition results in termination of the physical channels which would otherwise occur if the receiver does not receive any transmission from the transmitter within a certain duration and with a specified quality. In essence, the out-of-sync condition releases the physical channel and permits the receiver to re-allocate unused physical channel resources. The periodic transmission of SBs avoids this condition when the physical channels are of acceptable quality by guaranteeing periodic transmission of a signal.

The receiver needs to be able to distinguish between a condition whereby no signal is received due to physical problems with the radio channel such as interference or obstructions, and when no signal is received because the transmitter simply does not currently have information ready for transmission. The use of SBs permits the receiver to distinguish between the transmitter entering DTX mode and the transmitter ceasing to communicate.

Since SBs do not send data that is utilized by the receiver, they are designed to be sent periodically in order to establish or continue the communication link. They are also designed to utilize minimum energy resources. However, the periodic transmission of SBs represents wasted channel capacity which may be utilized for exchange of information.

It would be desirable to have a system which does not waste this channel capacity.

SUMMARY

The present invention is a system and method which utilize the data fields of an SB in order to signal physical layer control signaling for coordination between a Node B and a user equipment (UE). The control signaling may improve reception of SBs, may encode more TPC commands, may signal timing adjustments, or may transmit any other physical layer control signaling for coordination between a user equipment and a Node B. This system and method may be applied independently to the uplink (UL) and the downlink (DL).

BRIEF DESCRIPTION OF THE DRAWING(S)

DETAILED DESCRIPTION OF THE PREFERRED EMBODIMENT(S)

Figure 1:
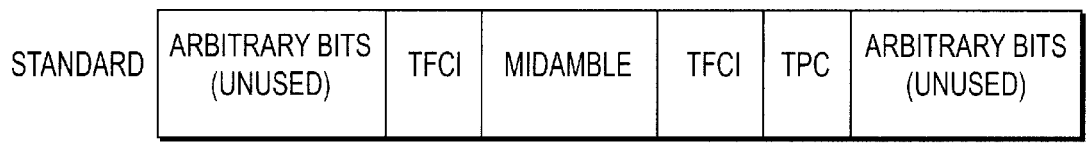
FIG. 1 is a diagram of a prior art standard SB.

The present invention will be described with reference to the drawing figures where like numerals represent like elements throughout.

It should be noted that the control signaling in accordance with the present invention signals information between a Node B. Although the signaling does not involve direct communication of information between the radio network controller (RNC) and the UE, signaling information could be relayed between Node B and the RNC to provide this expanded functionality. Furthermore, the present invention relates to any physical layer control signaling for coordination between the Node B and the UE, and may be applied equally and independently to the UL and/or the DL. Accordingly, the invention is applicable to more robust determination of SBs, transmission of TPC commands, synchronization timing advance and reconfiguration of some or all fields of the physical control channeling to name several applications specifically. However, the invention should not be limited to the examples hereinafter described.

Figure 2A:
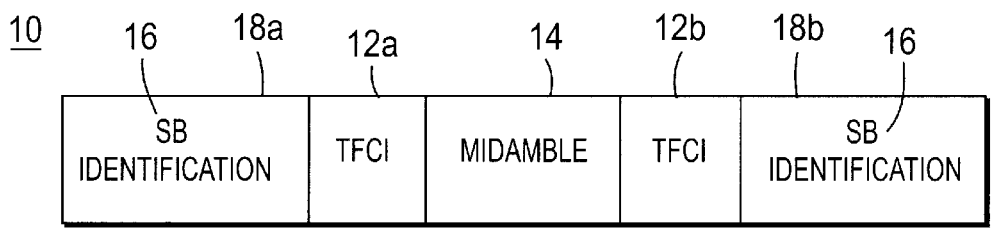
FIG. 2A is a first embodiment of an SB in accordance with the present invention utilizing the data fields for SB identification.

Referring to FIG. 2A, a first embodiment of the SB 10 in accordance with the present invention is shown. This embodiment allows for more reliable reception of an SB. Similar to a prior art SB, the SB 10 of this embodiment comprises two (2) TFCI fields 12a, 12b and a midamble 14. However, unlike the prior art, the SB 10 also includes an SB identification 16 in the data field 18a, 18b. This is some type of bit pattern or sequence that further ensures the knowledge that this data packet is an SB.

In the prior art, the SB is only identified by the TFCI value, that is not protected against incorrect detection by a cyclic redundancy check (CRC). Detection of an SB when one does not exist delays recovery of failed physical channels. Missed detection of an SB delays physical channel establishment and results in erroneous release of physical channels.

As is well known by those of skill in the art, the prior art method of distinguishing an SB from an NB is to match the sequence of bits in the TFCI fields 12a, 12b with a standard SB identification. If the bits included within the TFCI fields 12a, 12b match the known SB identification more closely than the identification of any NB, it is determined that an SB was transmitted. During DTX, the receiver must distinguish among three possibilities: 1) no signal was received; 2) an SB was received; or 3) an NB was received.

In accordance with the present invention, use of a separate SB identification 16 in one or both data fields 18a, 18b provides a second level of redundancy to improve receiver performance compared to a receiver that only processes the information within the TFCI fields 12a, 12b.

The SB identification 16 may be a generally known SB unique identification, or it may be an easily identifiable bit pattern. Examples of easily identifiable bit patterns include, but are not limited to, all zeros, all ones, alternating ones and zeros, banker codes or other sequences that have good autocorrelation properties.

In accordance with this embodiment of the present invention, the enhanced SB 10 improves the detection of SBs. Improved detection of SBs means a lower probability of missed detection when an SB is present, a lower probability of false detection when neither an SB or NB is present, a lower probability of declaring an SB is present when an NB was transmitted or some combination of the above. All three types of errors result in negative consequences. When SBs are transmitted during initial link establishment, the receiver determines when SBs end and NBs start, and at which point the received data in the NB data fields is processed. Erroneously declaring the presence of an NB when an SB was transmitted would cause erroneous data to be processed by the receiver.

During DTX, the SBs are periodically transmitted, for example once every N frames, and no signal is transmitted during the N−1 frames between SBs. If an SB is erroneously declared to be an NB, then the receiver will erroneously conclude that the transmitter is no longer in DTX and erroneous data would be processed. If one or more SBs are not detected, then the receiver may erroneously declare out-of-synch, possibly causing an undesired termination of the connection between the transmitter and receiver.

Figure 2B:
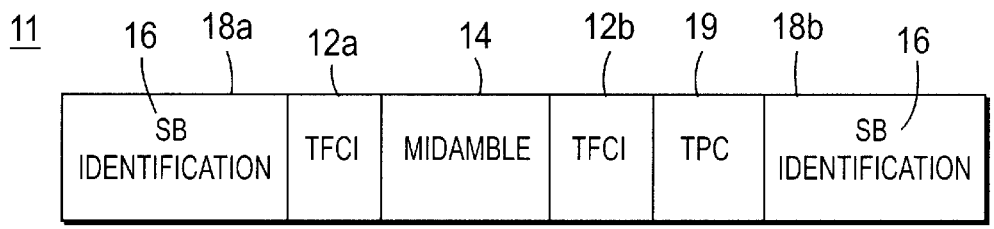
FIG. 2B is an alternative to the first embodiment which shows the inclusion of a TPC field.

Referring to FIG. 2B, an SB 11 in accordance with an alternative embodiment to the embodiment of FIG. 2A is shown. This SB 11 includes a TPC field 19 which transmits TPC commands.

A second embodiment of the present invention will be explained with reference to FIG. 3A. This embodiment is directed to the maintenance of TPC. In the event that there is no data to be transmitted, for example by the UE, SBs will be transmitted and TPC must be maintained in the UL so that the quality of the DL may be maintained at the correct power level. As described above, during DTX the SBs are periodically transmitted, for example once every N frames, and no signal is transmitted during the N−1 frames between SBs. The periodicity of SBs is configured. The current 3GPP standards set the default periodicity at one SB for every eight radio frames. Accordingly, the SB 20 in accordance with this embodiment of the present invention includes the enhanced TPC commands that are not transmitted during DTX.

The SB 20 of this second embodiment comprises a midamble 22, two (2) TFCI fields 24a, 24b and two (2) data fields 26a, 26b. The data fields 26a, 26b include additional TPC information 28, 30. It should also be noted that the TPC commands 28, 30 in the first and second data fields 26a and 26d may be redundant information or it may be different information, for example step size.

Compared to the embodiment of FIG. 1, it should be noted that the TPC commands 28, 30 use the full data fields 26a, 26b, compared to a short TPC field. The inclusion of TPC information 28, 30 in the data fields 26a, 26b may be used to send additional TPC information to more accurately control DL power during DTX. One possibility is to reduce the SB transmission periodicity, which will reduce UE battery consumption during DTX and improve overall air resource efficiency. For example, if the periodicity of the SB is one (1) burst for every eight (8) radio frames, (that is N=8) that means that for seven (7) of the eight (8) radio frames, TPC commands are not sent. The SB 20 shown in FIG. 3A permits the remaining seven (7) TPC commands as TPC commands 28, 30 in the data fields 26a, 26b of the SB. Accordingly, the DL achieves a similar channel quality as it would have if the UL channel with TPC was present. The DL can use all the TPC commands to compute DL power and the connection would achieve improved downlink performance as compared to an implementation that only uses the single TPC command associated with the prior art SB of FIG. 1.

It should be noted that although the periodicity of the transmission TPC commands has been set forth in the example as N=8, a greater or lesser periodicity may be utilized. Typical values range from N=2 to N=16. Additionally, although the SB 20 of this embodiment may be sent one (1) out of every eight (8) frames, the TPC commands 28, 30 may not be sent with every SB 20.

Figure 3A:
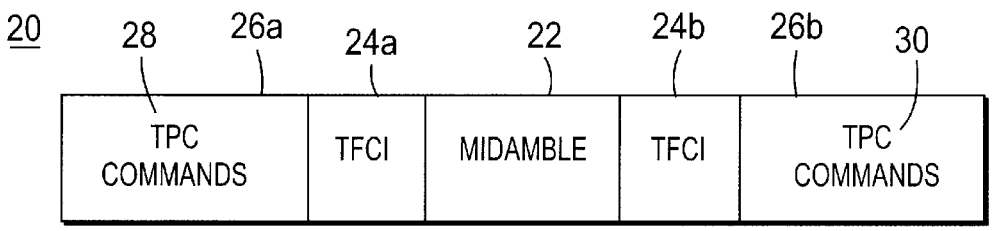
FIG. 3A is a second embodiment of an SB in accordance with the present invention utilizing the data fields for transmit power control signaling.
Figure 3B:
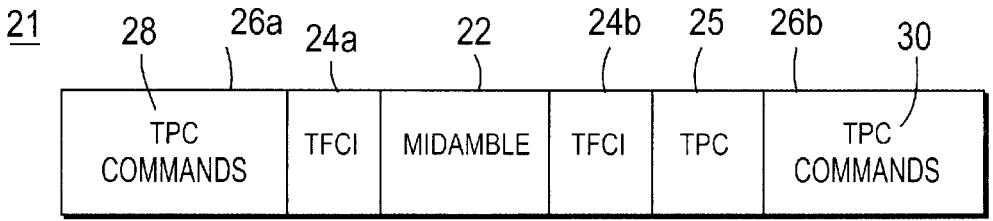
FIG. 3B is an alternative to the second embodiment which shows the inclusion of a TPC field.

Referring to FIG. 3A, alternative embodiment 21 to the embodiment of FIG. 3A is shown. This embodiment 21 shows the TPC field 25 which transmits TPC commands for that burst in addition to the TPC commands 28, 30 which are set in the data fields 26a, 26b.

Figure 4A:
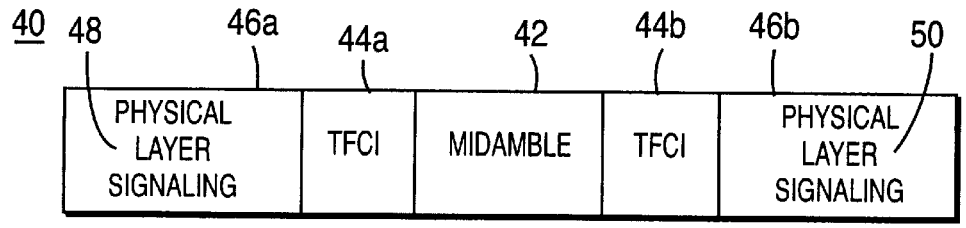
FIG. 4A is a third embodiment of an SB in accordance with the present invention utilizing the data fields for general physical layer control signaling.

A third embodiment of the present invention is directed to general physical layer control signaling as shown in FIG. 4A. The SB 40 of this embodiment comprises a midamble 42, two (2) TFCI fields 44a, 44b and two (2) data fields 46a, 46b. The data fields 46a, 46b include any physical layer signaling 48, 50. It should be noted that the physical layer signaling 48, 50 in the first and second data fields 46a, 46b may be redundant information or it may be different information. For example, the physical layer signaling 48 in the first data field 46a may be TPC commands and the physical layer signaling 50 in the second data field 46b may be SB identification.

Figure 4B:
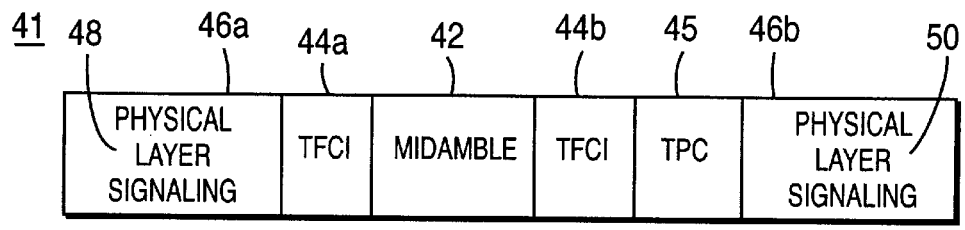
FIG. 4B is an alternative to the third embodiment which shows the inclusion of a TPC field.

Referring to FIG. 4B, an SB 41 in accordance with an alternative embodiment to the embodiment of FIG. 4A is shown. This SB 41 includes a TPC field 45 which transmits TPC commands.

Figure 5:
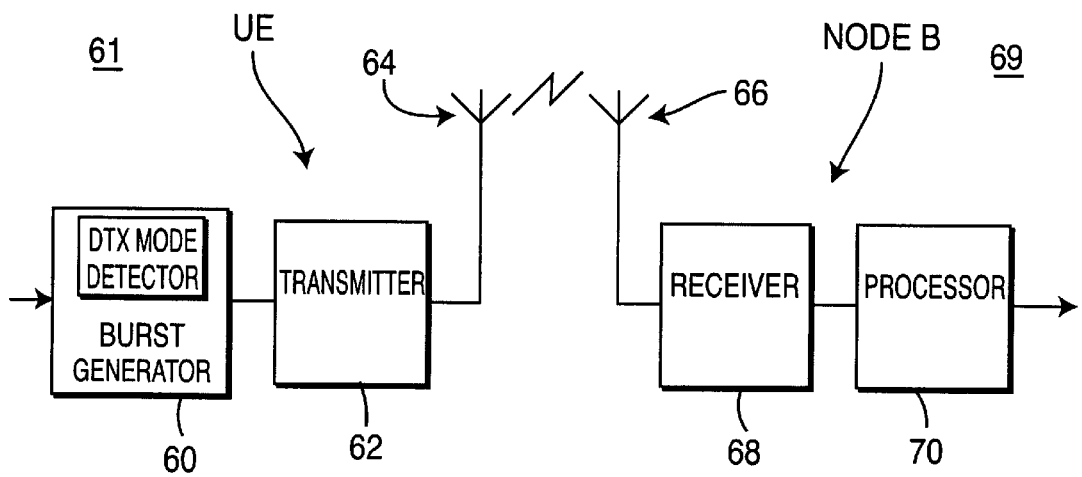
FIG. 5 is a UE and a Node B in accordance with the present invention.

FIG. 5 shows a block diagram of system elements used to perform the embodiments of FIGS. 2A through 4B. The UE 61 comprises a burst generator 60, which determines when DTX mode has been entered and generates the SBs, and a transmitter 62 which transmits the generated SBs via an antenna 64. The Node B 69 has an antenna 66 which receives the signal transmitted from the UE 61 and a receiver 68 which downconverts the received signal. The downconverted signal is then processed by the processor 70, which forwards the information included within the aforementioned data fields of the SB for further processing.

While the present invention has been described in terms of the preferred embodiments, other variations which are within the scope of the invention as outlined in the claims below will be apparent to those skilled in the art.

The system and method of the present invention apply to any physical layer control signaling for coordination between the UE and the Node B; either the UL or the DL. This includes, but is certainly not limited to, functions such as synchronization and timing advance or reconfiguration of fields of the physical channel, or SB detection and TPC as already described.

What is claimed is:

1. A User Equipment (UE) that supports communications during discontinuous transmission (DTX) mode, comprising:
   a detector for determining when DTX mode has been entered;
   a burst generator, for generating a special burst (SB) during DTX mode, the SB including a midamble, two transport format combination indicator fields, and two data fields, whereby at least one of the data fields includes an identification of the SB; and
   a transmitter, for transmitting the SB during DTX mode.

2. The UE of claim 1, wherein said SB further includes a transmit power control field for transmitting transmit power control information.

3. A User Equipment (UE) which implements discontinuous transmission (DTX) mode by periodically transmitting a special burst (SB), the SB having a plurality of fields including a midamble field surrounded by two transport format combination indicator fields, further surrounded by two data fields, the UE comprising:
   a detector for detecting when DTX mode has been entered; and
   a burst generator for periodically generating the SB during DTX mode; and
   a transmitter for transmitting the SB; whereby the data fields include SB identification information.

4. The UE of claim 3, wherein said SB further includes a transmit power control field for transmitting transmit power control information.

5. A User Equipment (UE) that supports communications during discontinuous transmission (DTX) mode, comprising:
   a detector for determining when DTX mode has been entered;
   a burst generator, for generating a special burst (SB) during DTX mode, the SB including a midamble, two transport format combination indicator fields, and two data fields, whereby at least one of the data fields includes transmit power control information; and
   a transmitter, for transmitting the SB during DTX mode.

6. The UE of claim 5, wherein said SB further includes a transmit power control field for transmitting additional transmit power control information that is not transmitted in said data fields.

7. A User Equipment (UE) which implements discontinuous transmission (DTX) mode by periodically transmitting a special burst (SB), the SB having a plurality of fields including a midamble field surrounded by two transport format combination indicator fields, which are further surrounded by two data fields, the UE comprising:
   a detector for detecting when DTX mode has been entered; and
   a burst generator for periodically generating the SB during DTX mode; and
   a transmitter for transmitting the SB; whereby the data fields include transmit power control information.

8. The UE of claim 7, wherein said SB further includes a transmit power control field for transmitting additional transmit power control information that is not transmitted in the data fields.

9. A User Equipment (UE) that supports communications during the discontinuous transmission (DTX) mode, comprising:
   a detector for determining when DTX mode has been entered;
   a burst generator, for generating a special burst (SB) during DTX mode, the SB including a midamble, two transport format combination indicator fields, and two data fields, whereby at least one of the data fields includes physical layer signaling information; and
   a transmitter, for transmitting the SB during DTX mode.

10. The UE of claim 9, wherein said SB further includes a transmit power control field for transmitting transmit power control information.

11. A User Equipment (UE) which implements discontinuous transmission (DTX) mode by periodically transmitting a special burst (SB), the SB having a plurality of fields including a midamble field surrounded by two transport format combination indicator fields, further surrounded by two data fields, the UE comprising:
   a detector for detecting when DTX mode has been entered; and
   a burst generator for periodically generating the SB during DTX mode; and
   a transmitter for transmitting the SB; whereby the data fields include physical layer signaling information.

12. The UE of claim 11, wherein said SB further includes a transmit power control field for transmitting transmit power control information.

13. A method for supporting communications during a discontinuous transmission (DTX) mode of operation, the method comprising:
   determining when DTX mode has been entered;
   generating a special burst (SB) during DTX mode, the SB including a midamble, two transport format combination indicator fields, and two data fields, whereby at least one of the data fields includes an identification of the SB; and
   transmitting the SB during DTX mode.

14. The method of claim 13, wherein said SB further includes a transmit power control field for transmitting transmit power control information.

15. A method for implementing discontinuous transmission (DTX) mode by periodically transmitting a special burst (SB), the SB having a plurality of fields including a midamble field surrounded by two transport format combination indicator fields, further surrounded by two data fields, the method comprising:
   detecting when DTX mode has been entered;

periodically generating the SB during DTX mode; and transmitting the SB; whereby the data fields include SB identification information.

16. The method of claim 15, wherein said SB further includes a transmit power control field for transmitting transmit power control information.

17. A method that supports communications during discontinuous transmission (DTX) mode, comprising:

determining when DTX mode has been entered;

generating a special burst (SB) during DTX mode, the SB including a midamble, two transport format combination indicator fields, and two data fields, whereby at least one of the data fields includes transmit power control information; and transmitting the SB during DTX mode.

18. The method of claim 17, wherein said SB further includes a transmit power control field for transmitting additional transmit power control information that is not transmitted in said data fields.

19. A method for implementing discontinuous transmission (DTX) mode by periodically transmitting a special burst (SB), the SB having a plurality of fields including a midamble field surrounded by two transport format combination indicator fields, which are further surrounded by two data fields, the method comprising:

detecting when DTX mode has been entered;

periodically generating the SB during DTX mode; and transmitting the SB; whereby the data fields include transmit power control information.

20. The method of claim 19, wherein said SB further includes a transmit power control field for transmitting additional transmit power control information that is not transmitted in the data fields.

21. A method for supporting communications during a discontinuous transmission (DTX) mode, comprising:

determining when DTX mode has commenced;

generating a special burst (SB) during DTX mode, the SB including a midamble, two transport format combination indicator fields, and two data fields, whereby at least one of the data fields includes physical layer signaling information; and periodically transmitting the SB during DTX mode.

22. The method of claim 21, wherein said SB further includes a transmit power control field for transmitting transmit power control information.

23. A method which implements discontinuous transmission (DTX) mode by periodically transmitting a special burst (SB), the SB having a plurality of fields including a midamble field surrounded by two transport format combination indicator fields, further surrounded by two data fields, the method comprising:

detecting when DTX mode has commenced;

periodically generating the SB during DTX mode; and transmitting the SB; whereby the data fields include physical layer signaling information.

24. The method of claim 23, wherein said SB further includes a transmit power control field for transmitting transmit power control information.

* * * * *